United States Patent [19]

Lee

[11] 4,234,214
[45] Nov. 18, 1980

[54] DOCUMENT CARRYING A LEGIBLE CODE, AND METHOD AND APPARATUS FOR PRODUCING SAME

[75] Inventor: Peter D. Lee, Hertford, England

[73] Assignee: Governor & Company of the Bank of England, London, England

[21] Appl. No.: 934,061

[22] Filed: Aug. 16, 1978

[51] Int. Cl.³ .................. B42D 15/00; B41L 27/30
[52] U.S. Cl. ................................ 283/57; 283/7; 283/8 R; 283/58; 400/126
[58] Field of Search .................. 40/2.2; 346/75; 400/126; 283/1 R, 6–8, 9 R, 17, 11, 12 R, 57–59

[56] References Cited

U.S. PATENT DOCUMENTS

| | | | |
|---|---|---|---|
| 1,144,742 | 6/1915 | Todd et al. | 283/9 R |
| 1,403,168 | 1/1922 | Kawasaki | 283/9 R |
| 1,656,928 | 1/1928 | Wheeler | 40/2.2 |
| 1,846,171 | 2/1932 | Wheeler | 40/2.2 |
| 3,964,389 | 6/1976 | Peterson | 346/76 L |
| 4,027,142 | 5/1977 | Paup et al. | 346/75 |
| 4,039,066 | 8/1977 | Quigley | 283/9 R |

Primary Examiner—Paul A. Bell
Attorney, Agent, or Firm—Mawhinney & Connors

[57] ABSTRACT

A document is provided having thereon a legible code to distinguish the document from other similar documents, the code comprising an arrangement of alphanumeric characters. Where the document is a banknote, the code may be the serial number which is unique to that banknote, and which is one of a series of such serial numbers carried on individual members of a set of such documents, and having sequential numerical values. To enhance the security value of the serial number portion of the document and to inhibit successful forgery thereof, the alphanumeric characters are provided in reverse, or negative form. The security value derives from the complexity and cost of the apparatus necessary to print a series of successive serial numbers in reverse, rather than positive form. The code may correspond to a code provided elsewhere on the document in positive form. Another reverse code on a different background may be provided elsewhere on the document.

11 Claims, 3 Drawing Figures

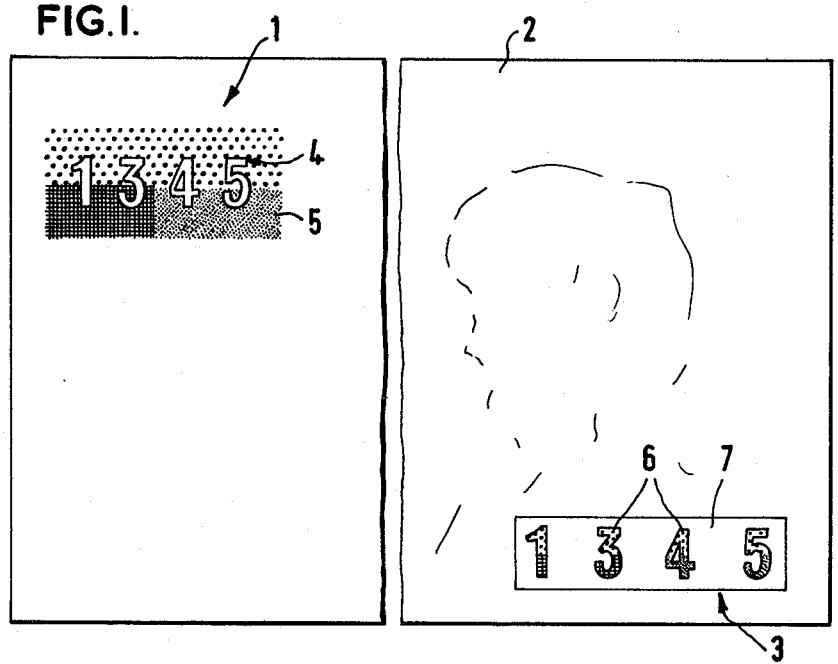
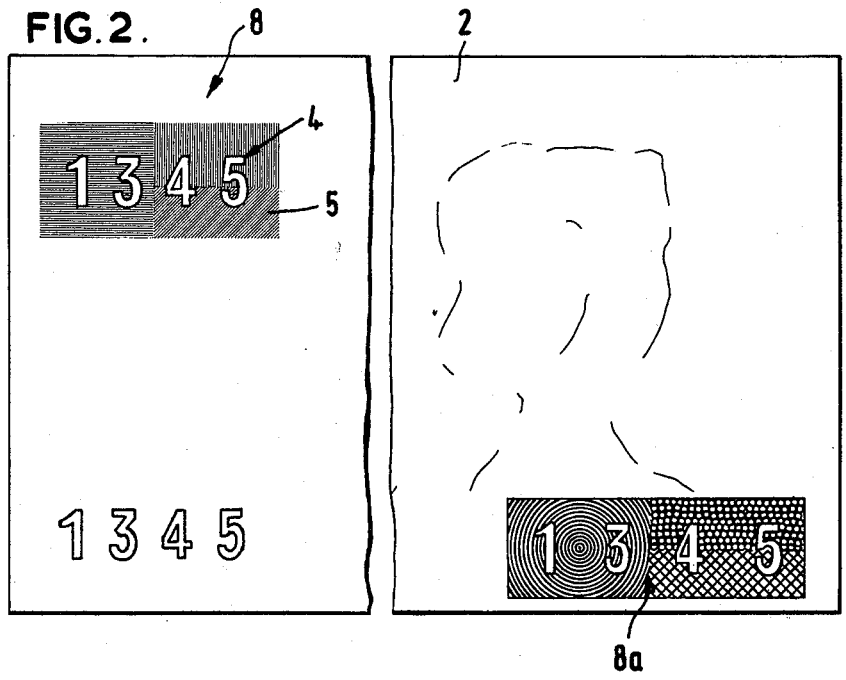

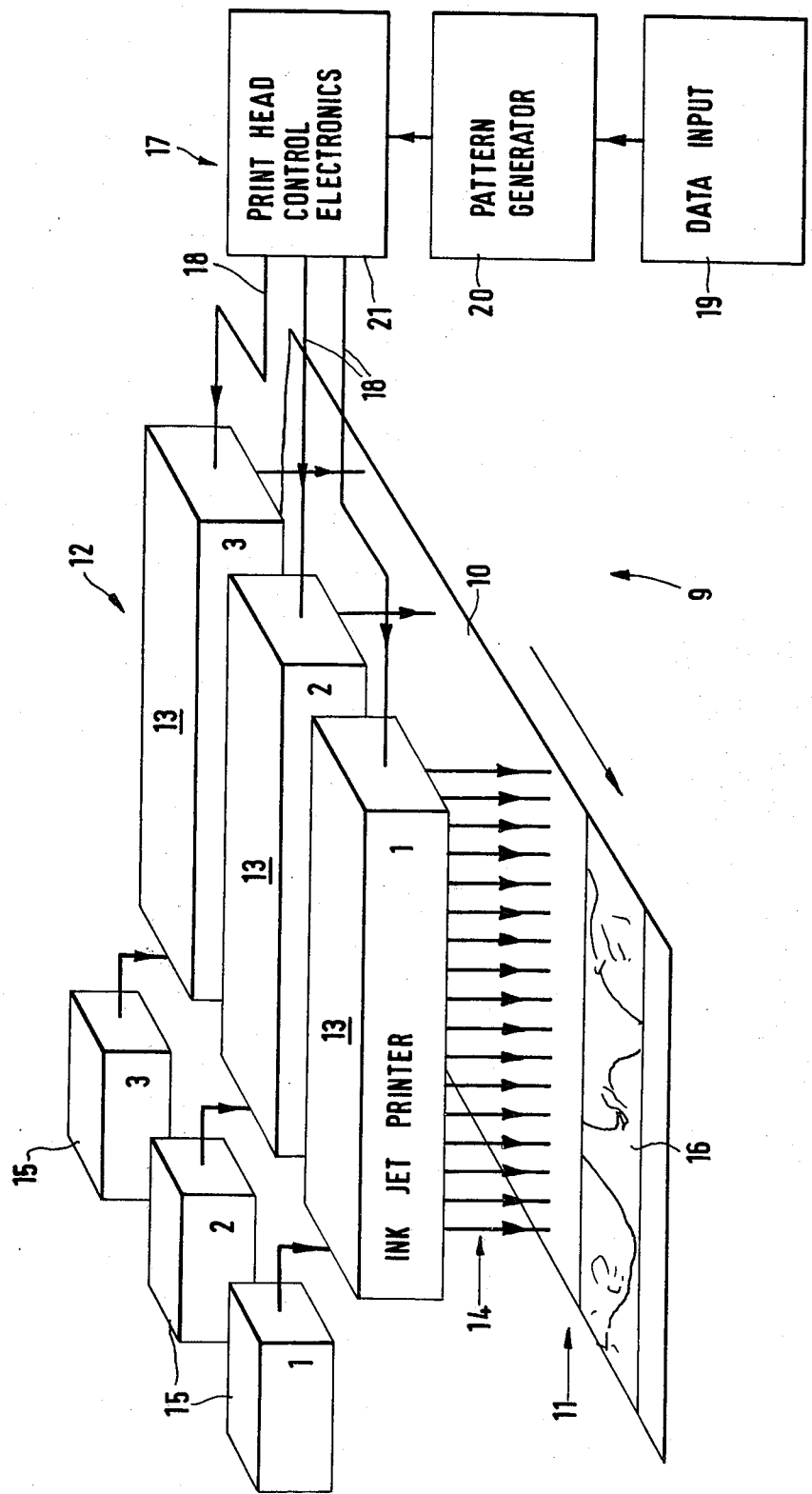

DOCUMENT CARRYING A LEGIBLE CODE, AND METHOD AND APPARATUS FOR PRODUCING SAME

FIELD OF THE INVENTION

This invention relates to a document, such as a banknote, identity card, credit card, ticket or other document of value carrying a legible code for distinguishing the document from other similar documents, and to a method and apparatus for applying the code to the document.

The code frequently comprises a unique combination of alphanumeric characters which are commonly termed, especially on banknotes, the cypher and serial number.

BACKGROUND TO THE INVENTION

This serial number is usually the only feature unique to an individual banknote, but seldom has any high security value in itself, although it generally comprises a unique typeface. When a forgery is discovered, the serial number is frequently circulated to warn the public that notes bearing this number are suspect. In order to circumvent this the forger may utter forgeries with different serial numbers and the more the form of the characters differs from that of conventional characters the more difficulty he will have in obtaining a suitable serial numbering device. An alternative method of forgery is to photograph the numbers on a note and print a series of forgeries bearing this serial number by conventional methods. Changing the serial number will then involve a separate photographic and plate-making process for each serial number used and the more difficult this process the slower and more time consuming it is to produce forgeries with differing serial numbers.

The security means disclosed herein are therefore intended to make the serial numbers a positive security feature, by making them unique in style and difficult to print except by a specially manufactured machine.

SUMMARY OF THE INVENTION

According to the invention, there is provided a document carrying a legible code to distinguish the document from other similar documents, said code including an arrangement of alphanumeric characters in reverse, or negative form as herein defined.

The invention also provides a method of manufacturing a plurality of individually identifiable similar documents, including applying a different legible code on each document, each code comprising an arrangement of alphanumeric characters in reverse, or negative form.

According to the invention there is further provided apparatus for producing a plurality of individually identifiable similar documents, including means for applying to documents different respective legible codes each comprising an arrangement of alphanumeric characters, the said means being adapted to apply said codes in reverse, or negative form.

As used herein, the term alphanumeric means alphabetic and/or numeric, the negative or reversed characters means characters consisting of unprinted areas on a printed or coloured background.

The code preferably corresponds, though in reverse or negative form, to a code provided elsewhere on the document in positive form and comprising the same arrangement of characters. The background for the reverse code preferably comprises interfitting areas or patterns of different colours, the reverse code being produced by a highly controllable printing process, such as ink-jet, or ink-drop printing or by a process of controlled removal of ink printed on to the document by conventional, for example intaglio or offset-lithographic printing processes. This controlled removal, to leave blank areas constituting the code, might be achieved by employing a burning-away process using a laser beam or beams or by mechanical or other means.

Alternatively, or additionally, one or more further codes of identical character arrangements and in reverse form preferably on a differently coloured single or multicolour background to the background of the first-mentioned reverse code, may be provided on the document. The application of such further reverse code or codes may be by ink-jet printing and/or ink removal as before.

Where the same code appears more than once on the document, the form and spacing of the characters shold be as nearly identical as possible to permit ready recognition of forgeries of poor quality code matching. Where ink-jet printing is used for producing both codes this matching can be achieved by appropriate simultaneous electronic control of the ink-jet nozzles, or nozzle assemblies printing the respective codes. Where one code is in positive form and the other in reverse, the signals controlling the deposition of ink at the two code locations on the document will be generally complementary, so that at any instant in time during printing, one jet printer will be depositing ink, and the other will not.

An alternative method might be to arrange for the reverse number pattern to be triggered off by sensing, such as by optically reading, suitable characters in a positive number reproduced by conventional methods.

Where a reverse code is produced by ink removal, a moving laser beam might be controlled by reading a positive code applied conventionally to the document. Alternatively, an ink-jet printer and a laser might be operated simultaneously to ensure correspondence between a positive and a negative code produced respectively thereby.

Some embodiments of the invention will now be described by way of example, with reference to the accompanying drawings.

BRIEF DESCRIPTION OF THE DRAWINGS

FIG. 1 illustrates a banknote, bearing a serial number, according to the invention, FIG. 2 illustrates another banknote according to the invention, bearing two serial numbers constituted by the same arrangement of alphanumeric characters in reverse or negative form upon different backgrounds; and FIG. 3 is a schematic perspective diagram illustrating printing apparatus for use in the production of a document according to the present invention.

According to a first proposal, banknotes are numbered by a specially developed multiple ink-jet printing system.

DETAILED DESCRIPTION OF THE PREFERRED EMBODIMENTS

While the numbering may take place at the conventional point in the note production process, this system alternatively allows numbering to take place after the processes of visual examination, cutting to single notes and automatic spoil rejection with consequent economy of print ink and the improvement in the degree of completeness of the numbered sequence. The notes are preferably numbered in two places with the same serial number.

With reference to the embodiment illustrated in FIG. 1, an improvement in security value arises from the fact that while one such number consists of normal positive characters, the other would be identical but in negative or reverse form, i.e. an unprinted number on a coloured background area. It is believed that numbering barrels using reverse characters are not readily available, and this uniqueness would, in itself, be a security advantage.

However, with ink-jet printing, in which a jet of fine, charged ink droplets is controlled by deflection plates or other means either to impinge upon the target surface or to be deflected to a waste ink catcher, the question of whether ink is to be applied to an area or not is under electronic control, and it is possible to apply to one ink-jet numbering system the reverse signals to those applied to the other, resulting in well matched positive and negative serial numbers. High quality printing is possible with the ink-jet system and multi-colour printing by this method is achieved by using a plurality of ink-jet nozzle assemblies, one for each colour ink. It is therefore proposed, as illustrated in FIG. 1 of the accompanying drawings, that the reversed number 1 at one position on a banknote 2 with characters corresponding to those of the positive number 3 at the other position be applied with an overriding electronic multi-colour masking system which would result in white numbers 4 (presuming the banknote paper to be white) on a multi-colour area 5 of some complicated pattern. This particular feature is intended to increase the difficulty of reproduction of the numbers by any conventional printing method because the alternatives open to the forger if he is to produce convincing forgeries each present considerable difficulties.

Preferably, and as illustrated in FIG. 1, the characters 6 of the positive number 3 are formed in multi-colour upon a background which may simply be a part of the banknote design or alternatively an unprinted area 7. Where complementary control signals are employed to control two sets of multi-colour ink-jet nozzle assemblies, one set for the positive number and one for the negative number, the arrangement of the various coloured portions of the characters 6 may accordingly be complementary, i.e. such that a notional superimposition of the positive number on the negative number would constitute the basic unmarked multi-colour background.

The process of forgery could be made that much more difficult if the two numbers were printed in different multi-colour arrangements.

FIG. 2 illustrates a note printed in this manner. Two reverse numbers 8 and 8a are printed at different parts of the note on different multi-colour backgrounds.

Alternatively one number may be positive, its colouring arrangement being non-complementary to the background of the negative number.

It could be made even more difficult by incorporating known protective methods in the reverse number multi-colour backgrounds, such as the use of special patterns.

FIG. 3 illustrates schematically printing apparatus 9 suitable for printing onto a continuous web 10 of sheet material a code 11 of reverse alphanumeric characters in a manner according to the aforesaid first proposal. Alternatively, the sheet material might be presented as a series of individual sheets. The apparatus comprises a print head 12 which consists of a set of ink-jet printers 13. Each printer 13, of which there are three in the illustrated embodiment, includes a linear array of nozzles for the production of a plurality of ink-jets 14, the printer being arranged to direct these ink jets toward the surface of the web 10 on which the code is to be printed. The number, and arrangement of the nozzles in each printer must be sufficient to ensure that the jets are capable of depositing over the width of the code 11. Associated with each printer 13 is an ink supply 15, the ink colour being different for each printer.

A drive system (not shown) is provided for advancing the web 10 beneath the print head 12, the printers 13 being so arranged that, when controlled with appropriate timing depending upon the speed of movement of the web, they can each deposit ink in the same code area 16 on the web.

Ink jet printers are now well known in the art of colour printing, and accordingly the presentation herein of a detailed description of the construction and manner of operation of such printers is not considered necessary. However, a brief and general description may be of assistance in the understanding of the present invention.

The jets emerging from the printers are broken into droplets by modulating the streams emerging from the nozzles such that monosized, uniformly spaced droplets are generated. The droplets in each jet will be electrostatically charged and deflected to predetermined positions on the web by means of controlled deflection plates. In the present case, each printer will deposit one colour component of a three-colour code background, the reverse characters of the code comprising areas where no ink is deposited. To produce these non-printed areas, some of the ink droplets will be deflected toward an ink catcher provided in the printer and will accordingly be prevented from reaching the web.

The inks used should be resistant to water and common solvent attack and have good abrasion resistance. Methanol or ethanol based inks, for example, will be suitable.

The various components of the printers, such as the droplet generator, charger and deflector are operated under electronic control in accord with a predetermined program to lay down the required background and reverse characters.

Numeral 17 indicates generally the control electronics which are connected to the printers 13 by lines 18 along which electronic control signals will flow.

The basic signals necessary for the production of the droplet jets are derived from a data input unit 19 and are supplied to a pattern generator 20. This stores the data co-ordinates which define fully the three-colour background pattern to be applied at the required points on the web, and transforms the data input signals from unit 19 into drop control signals. The pattern generator will also electronically mask the reverse characters upon the background pattern, and where the code is a serial number, this masking will be sequentially changed to produce sequential numbering. The drop control signals are appropriately processed in print head control electronics 21 into a form directly utilizable by the printers 13.

The signals applied to the three printers are mutually timed to ensure that the different coloured inks are deposited within the same background area.

According to a second proposal a reversed number is formed in a printed background area on a note by means of a suitable controlled laser beam or other means of removing the print ink number under the control of a character defining unit. Where the reverse number corresponds to a positive number elsewhere on the note, two alternative methods are proposed for ensuring proper matching of the two numbers.

Firstly, the positive serial number pre-printed in suitable characters by conventional means could be read or followed by a suitable mechanism to generate signals for controlling the movement of the laser beam or other means of removing the ink.

Secondly, an electronically controlled numbering system could be used for controlling the movement of the laser beam or the simultaneous operation of an ink-jet printer applying the positive number.

The background ink which is removed by the laser may be originally applied by any suitable printing process, such as intaglio or offset-lithography. The complex printing and laser ink removing apparatus which would be required to produce acceptable forgeries is not likely to be in the reach of the average forger.

Forgery could be made more complicated by the use of multi-coloured intaglio printing in producing the background to the numbers on genuine notes.

We claim:

1. A set of banknotes, wherein each banknote carries at a first position a legible code, unique to that banknote, consisting of an arrangement of alphanumeric characters in a negative reverse form within a multi-color background which immediately surrounds said characters and which is printed upon the banknote using printing media of a plurality of different colors, and also carries at a second position a further legible code consisting of said named arrangement of alphanumeric characters in a positive form, and wherein said codes comprise serial numbers by which the banknotes are sequentially numbered.

2. A set according to claim 1 wherein, in respect of each banknote, the positive characters of said further code, and the background to said first-mentioned code comprise complementary patterns of the same colors.

3. A set according to claim 1 wherein each banknote carries an additional legible code including, in reverse negative form, the same arrangement of alphanumeric characters as is included in the first-mentioned code upon a multi-color background different to that of said first-mentioned code.

4. A set according to claim 3 wherein in respect of each banknote the backgrounds of said first-mentioned and additional codes comprise different patterns of the same colors.

5. A method of manufacturing a set of individually identifiable banknotes, including, in respect of each banknote, applying at a first position thereon a unique legible code consisting of an arrangement of alphanumeric characters in a negative reverse form within a multi-color background immediately surrounding said characters by printing said background upon the banknote using printing media of a plurality of different colors, and applying at a second position thereon a further legible code consisting of said named arrangement of alphanumeric characters in positive form, said codes comprising serial numbers by which the banknotes are sequentially numbered.

6. A method according to claim 5, wherein said positive characters of said further code and the background to said reverse characters of said first-mentioned code on each banknote are formed as complementary patterns of the same colors.

7. A method according to claim 5 including applying on each document an additional legible code including, in reverse or negative form, the same arrangement of alphanumeric characters as is included in the first-mentioned code, upon a multi-color background different to that of said first-mentioned code.

8. A method according to claim 7 in which the said arrangement of characters of the legible code or at least one of the legible codes on each banknote is formed by means of ink-jet printing apparatus.

9. A method according to claim 7 wherein said backgrounds of said first-mentioned and said additional codes on each banknote are formed using the same colors.

10. A method according to claim 5 in which the said arrangement of reverse characters of the legible code on each banknote is formed by removing ink from a previously printed area on the document.

11. A method according to claim 5 in which said arrangement of characters of the legible code or at least one of the legible codes on each banknote is formed by ink-jet printing apparatus.

* * * * *